Aug. 26, 1952 — C. M. ELLIS — 2,608,149
BARBECUE UNIT
Filed April 18, 1949 — 4 Sheets-Sheet 1

INVENTOR
C. M. Ellis
BY
ATTORNEYS

Aug. 26, 1952  C. M. ELLIS  2,608,149
BARBECUE UNIT
Filed April 18, 1949  4 Sheets-Sheet 3
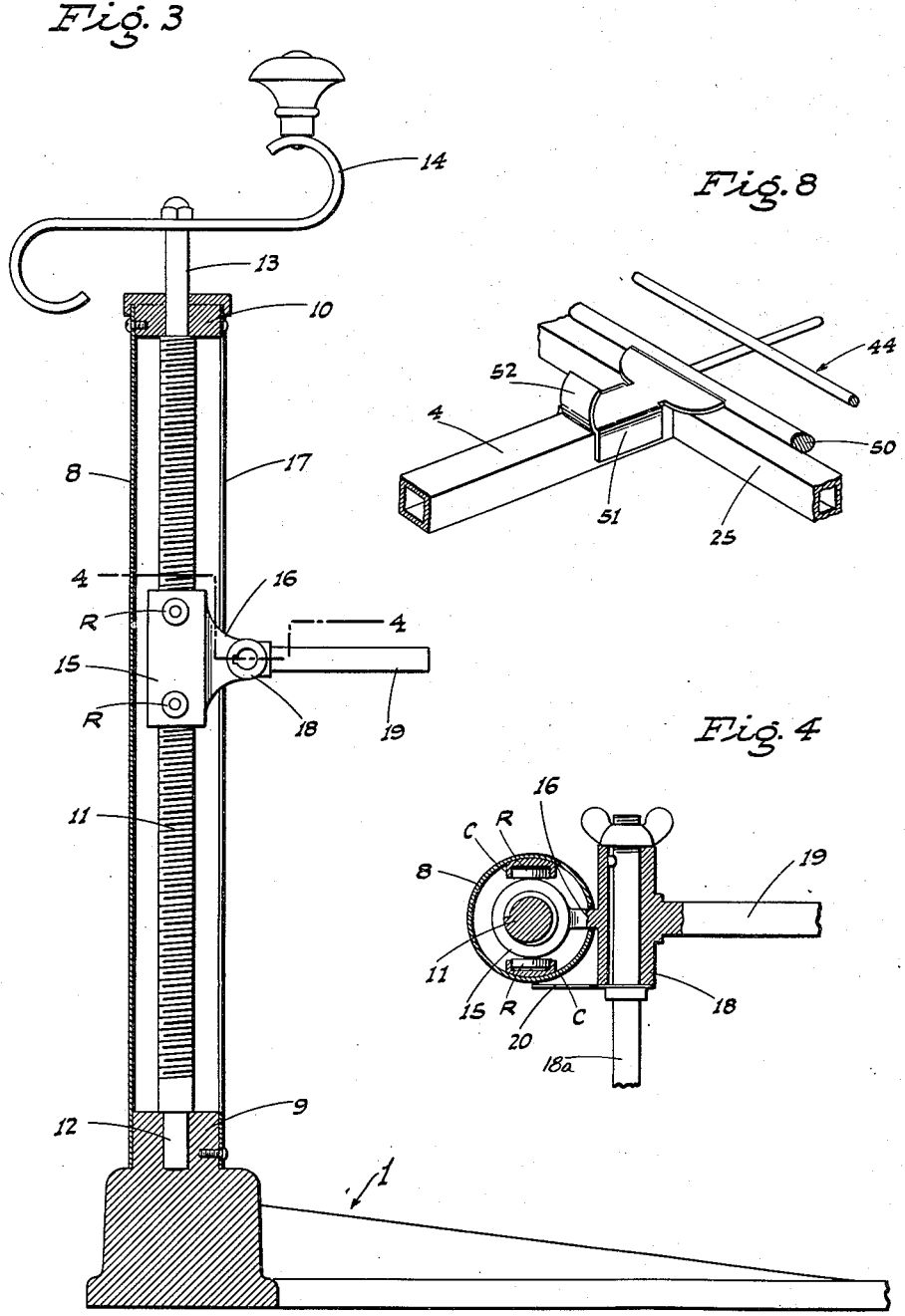
INVENTOR
C. M. Ellis
BY
ATTORNEYS Aug. 26, 1952     C. M. ELLIS     2,608,149
BARBECUE UNIT
Filed April 18, 1949     4 Sheets-Sheet 4
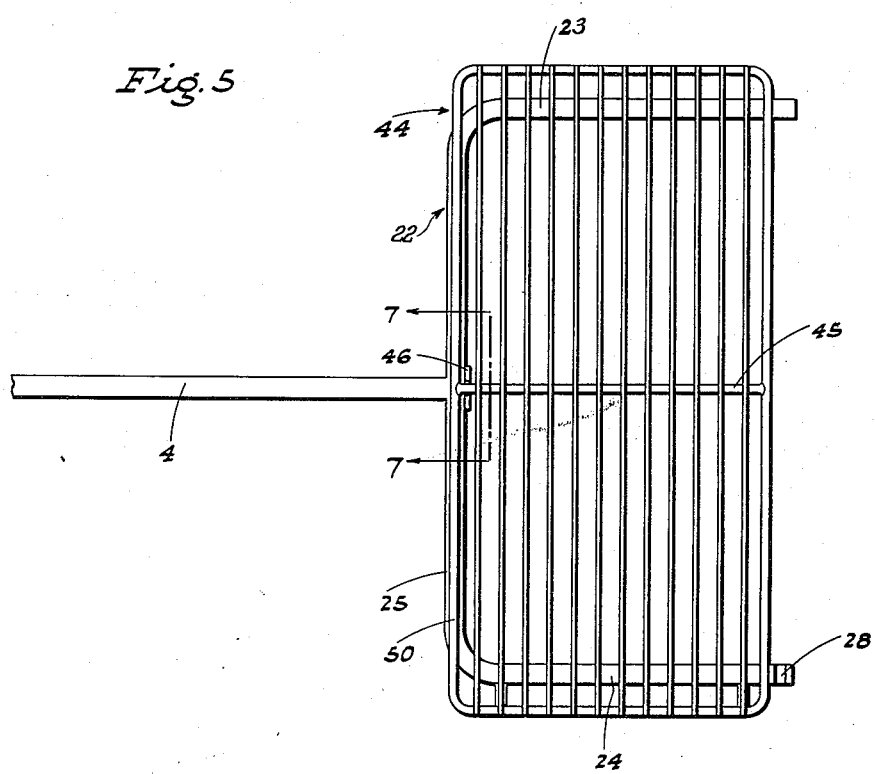
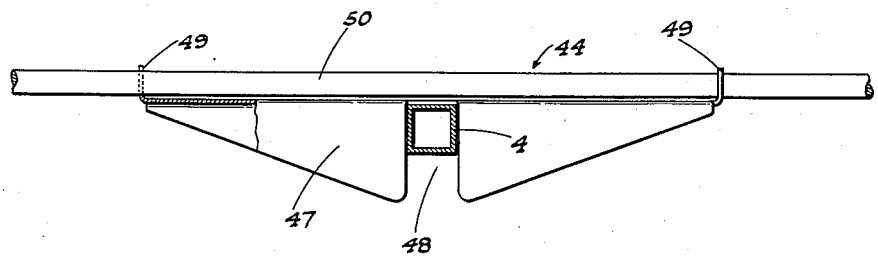
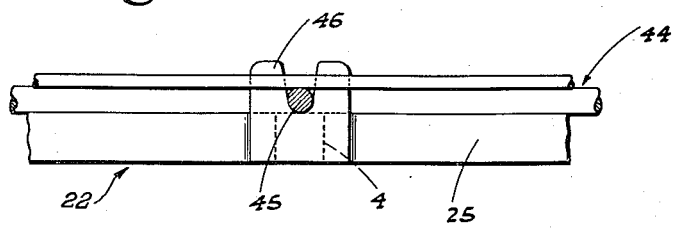
INVENTOR
C. M. Ellis
BY
ATTORNEYS Patented Aug. 26, 1952

2,608,149

UNITED STATES PATENT OFFICE 2,608,149

BARBECUE UNIT

Clarence M. Ellis, Lodi, Calif., assignor of one-third to J. E. Devine, Lodi, and one-third to Lilybelle Prentice, Acampo, Calif.

Application April 18, 1949, Serial No. 88,091

2 Claims. (Cl. 99—421)

This invention is directed to, and it is an object to provide, a novel barbecue unit for supporting food over a bank of coals, as in a fireplace or an outdoor campfire; the unit being especially designed, but not limited, for home or domestic use.

Another object of the invention is to provide a barbecue unit which is readily portable; stable when in use; and capable of being easily manually dismantled for compact storage of the parts of said unit.

A further object of the invention is to provide a barbecue unit which incorporates a flat grille for the broiling of food in a stationary position, and a power driven, rotary spit for roasting of food while constantly turning the same; the grille and spit being usable selectively.

An additional object of the invention is to provide a barbecue unit which includes a novel mechanism for vertically adjusting the food supporting grille, or spit, whereby to vary the distance of the food above the coals as proper cooking may require.

It is also an object of the invention to provide a barbecue unit which is designed for ease and economy of manufacture.

A still further object of the invention is to provide a practical and reliable barbecue unit, and one which will be exceedingly effective for the purpose for which it is designed.

These objects are accomplished by means of such structure and relative arrangement of parts as will fully appear by a perusal of the following specification and claims.

In the drawings:

Fig. 3 is an enlarged, fragmentary sectional elevation showing mainly the post unit.

Fig. 4 is a fragmentary sectional plan view on line 4—4 of Fig. 3.

Fig. 5 is a fragmentary plan view of the food supporting assembly showing the same as used with the grille.

Fig. 6 is an enlarged fragmentary cross section on line 6—6 of Fig. 1.

Fig. 7 is an enlarged fragmentary cross section on line 7—7 of Fig. 5.

Fig. 8 is a fragmentary perspective view showing a modified form of grille locator.

Figure 1:
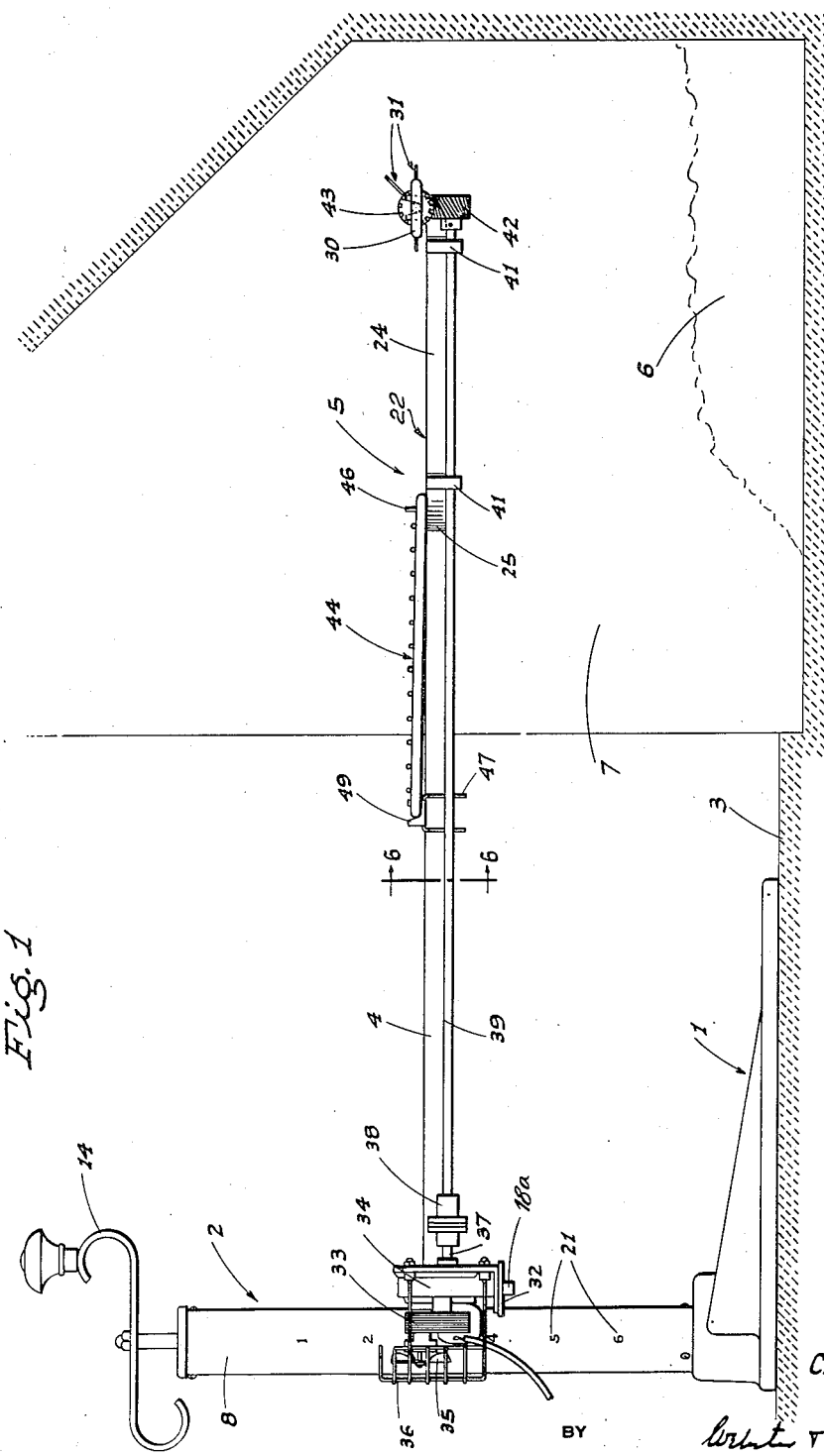
Fig. 1 is a side elevation of the barbecue unit in use.

Referring now more particularly to the characters of reference on the drawings, the novel barbecue unit comprises a horse-shoe shaped base 1 having a post unit, indicated generally at 2, upstanding from the closed end of said base; the latter—when the device is used at a fireplace—seating on the hearth 3.

A horizontal bar 4 projects forwardly from the post unit 2 a substantial distance beyond the base 1, and at its forward end such bar 4 is formed with a food supporting assembly, indicated generally at 5. The food supporting assembly 5 is thus adapted to be disposed above a bed of coals 6 at a point ahead of the base 1, as—for example— in a fireplace 7.

At its rear end the bar 4 is vertically adjustably secured to the post unit as follows:

The post unit 2 comprises a vertical tubular post 8 fixed, at its lower end, to an upstanding boss 9 integral with the base 1; the upper end of the tubular post 8 being closed by a head 10. A vertical screw 11 is disposed within the tubular post 8, being mounted for rotation therein by a lower end spindle 12 turnable in the boss 9, and an upper end spindle 13 which projects through the head 10 in rotatable relation.

Above the head 10 the spindle 13 is fitted with a hand crank 14.

A nut 15 runs on the vertical screw 11 in the tubular post 8; such nut including a vertical web 16 which projects forwardly through a vertical slot 17 in the front of the tubular post 8. To prevent rotation of nut 15, and binding of the same on the screw 11 due to pressure of the load carried by the assembly 5, the nut is provided on each side with vertically spaced rollers R riding in channels C secured in the post 8. (See Fig. 4.) With this arrangement, rotation of the screw 11 by the hand-crank 14 results in the nut 15 running easily up or down in said post 8.

Exteriorly of the post 8 the web 16 is formed integral with a horizontal, transverse sleeve 18 whose purpose is hereinafter described, and an elongated, horizontal boss 19 projects forwardly from said sleeve; said boss being rectangular in cross section.

The forwardly projecting bar 4 is tubular and matchingly engages, in removable relation, at its rear end portion, on the elongated boss 19, whereby said bar 4 is effectively supported by the post unit 2.

When the nut 15 is adjusted up or down by the hand crank 14, the bar 4 and food supporting assembly 5 are correspondingly vertically adjusted. This is for the purpose of selective positioning of the food above the bed of coals 6. A pointer 20 on one end of the transverse sleeve 18 reads on the corresponding side of the tubular post 8, which side of the post carries a vertical row of numbers 21, with said numbers becoming successively higher from top to bottom of the row so as to indicate higher cooking temperature.

The food supporting assembly 5 comprises the following:

At its forward end the bar 4 is secured centrally to the rear end of a substantially horizontal, forwardly opening U-shaped yoke, indicated generally at 22, which yoke includes side legs 23 and 24, connected by a back cross bar 25.

The numeral 26 indicates a spit rod which projects at one end portion through a bore 27 in the forward end of the leg 23; and other end portion of the spit rod 26 being received in a cradle 28 on the forward end of the leg 24.

The end of the spit rod 26 adjacent the bore 27 is pointed, as at 29, to facilitate entry of the rod through such bore. At its opposite end the spit rod 26 includes a hand eye 30. Facing tine units 31 are secured to the spit rod 26 between the legs 23 and 24 for the purpose of holding food on the spit rod 26 for rotation therewith.

The spit rod 26 is slowly rotated by means of the following drive mechanism:

A lateral rod 18a is removably secured, at its inner end, in non-rotatable relation in the transverse sleeve 18 by means including a wing nut, as shown.

At its outer end the lateral rod 18a is fitted with a platform 32 which supports an electric motor 33 which drives a reduction gear box 34; such electric motor including a cooling fan 35 disposed within a cage 36.

The reduction gear box 34 includes a forwardly projecting output shaft 37 fitted with a flexible coupling or universal joint 38. A drive rod 39 is removably secured in the coupling 38 by a wing screw 40, and such drive rod 39 extends forwardly in turnable relation through ears 41 projecting laterally from the leg 24.

At its forward end the drive rod 39 is fitted with a worm gear 42 disposed directly below the adjacent part of the spit rod 26; said part of the rod carrying a worm gear 43 which meshes with the worm gear 42. With this arrangement a slow speed drive is imparted from the motor reduction driven box 34 to the spit rod 26, whereby food on the latter is turned slowly—for roasting—above the bed of coals 6.

When it is desired to use a rectangular grille 44 rather than the spit rod 26 to support the food, said spit rod is removed from the yoke 22 by lifting the hand eye 30 to clear the rod from the cradle 28 and worm gear 43 from worm gear 42; the rod then being withdrawn from the bore 27.

With the spit rod 26 so detached, the rectangular grille 44 is disposed in covering relation on the yoke 22 in the manner shown in Fig. 5; the longitudinal center rod 45 of said grille then resting at its rear end portion in an upstanding cradle 46 secured to the yoke cross bar 25 centrally of the ends of the latter.

With the grille in this position food may be placed thereon for broiling in a stationary position.

Figure 2:
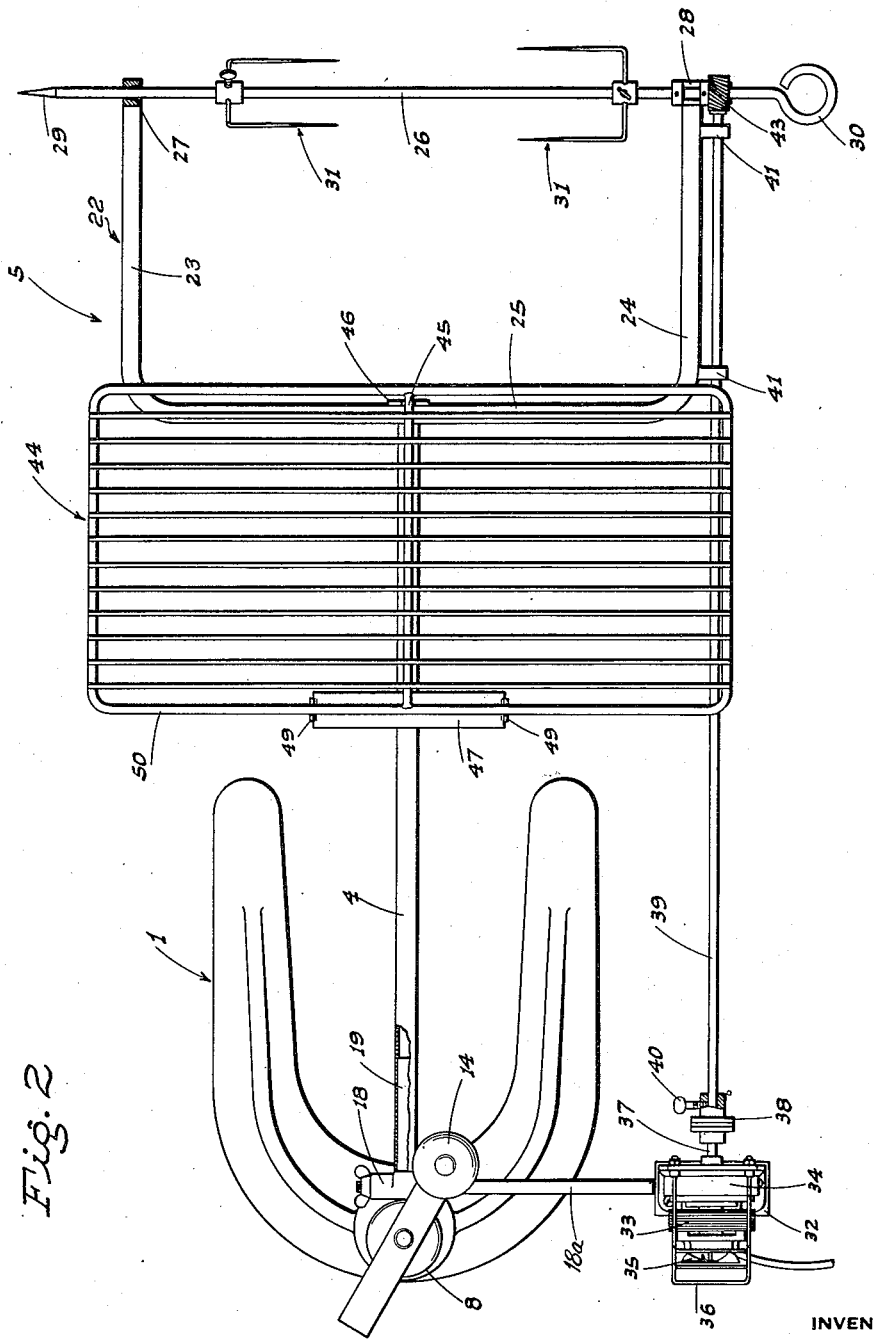
Fig. 2 is a top plan view of the same.

In order to provide an effective out-of-the-way support for the grille 44 when the spit rod is in use, the following arrangement is employed:

The grille 44, when not in use, is retracted to the position shown in Figs. 1 and 2, with the front part of such grille resting on the rear portion of the yoke 22; the longitudinal center rod 45 of the grille then seating, at its forward end, in the cradle 46. The rear portion of the grille 44 is supported by a relatively wide, transverse saddle 47, rectangularly slotted downwardly, as at 48, for engagement over the rectangular bar 4. At opposite ends the saddle 47 includes upstanding cradles 49 which receive the rear transverse rod 50 of the grille. The transverse saddle 47 is removable from the bar 4, so that it may be detached when the grille 44 is not supported in its retracted position of Figs. 1 and 2.

In the locator arrangement shown in Fig. 8, the grille locating cradle 46 is eliminated, and in place of this cradle a saddle 51 is rigid with and projects rearwardly from the rear rod 50 of the grille. This saddle slidably straddles bar 4 and is provided with an upstanding finger 52 so that the grille may be slid back and forth from the rear by suitable engagement of said finger by a poker or the like.

The described barbecue unit provides a very unique, as well as convenient and practical device for the barbecue cooking of food—either on the rotary spit, or stationary grille—over a bed of coals. The cook can, by the simple manipulation of the hand crank 14, adjust the food supporting assembly 5 to a desired height above the bed of coals; the numbers 21 on the pointer 20 giving an indication of the cooking position.

When the barbecue unit is not in use the projecting parts thereof can be easily detached for compact storage; the rod 18a detaching from the sleeve 18; the drive rod 39 detaching from the coupling sleeve 38 and being withdrawable forwardly out of the ears 41; and the spit rod 26 and rectangular grille 44 being removable. Additionally, the bar 4 is readily detachable from the elongated boss 19.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A barbecue unit comprising a base, an upright post supported on the base, an elongated arm projecting outwardly from the post, a substantially U-shaped yoke projected outwardly from the end of the arm and lying in a horizontal plane, a spit having a shaft journaled for rotation in the outer ends of the arms of the yoke, a second arm on the post projecting outwardly therefrom at substantially right angles to the first named arm, a motor supported on the second arm, and a shaft connected in driving relation with the motor and projecting in substantial parallelism with one side of the yoke, said shaft being connected in driving relation with the spit; the journals for the spit shaft comprising a bore in the end of one arm of the yoke and a cradle in the end of the other arm of the yoke, one end of the spit shaft projecting through the bore and the other end of said shaft resting in the cradle, a gear on the shaft at said other end, the drive shaft from the motor being journal-supported on the yoke arm which carries the cradle, and a gear on the outer end of the drive shaft in mesh with the under side of the gear on the spit shaft.

2. A unit as in claim 1 including a manually engageable handle member on the end of the spit shaft beyond the gear on said shaft.

CLARENCE M. ELLIS.

(References on following page)

REFERENCES CITED

The following references are of record in the file of this patent:

UNITED STATES PATENTS

| Number | Name | Date |
|---|---|---|
| 1,113,473 | Noreck | Oct. 13, 1914 |
| 1,384,250 | Froom | July 12, 1921 |
| 1,423,612 | Jewett | July 25, 1922 |
| 1,666,293 | Lorton | Apr. 17, 1928 |
| 1,747,325 | Schey | Feb. 18, 1930 |
| 1,986,620 | Borden et al. | Jan. 1, 1935 |
| 2,187,283 | Scheutz | Jan. 16, 1940 |
| 2,324,233 | Parsons | July 13, 1943 |
| 2,388,831 | Cramer | Nov. 13, 1945 |
| 2,391,571 | Hennessy | Dec. 25, 1945 |
| 2,401,417 | Engle | June 24, 1946 |
| 2,486,345 | Triulzi | Oct. 25, 1949 |

FOREIGN PATENTS

| Number | Country | Date |
|---|---|---|
| 276,053 | Great Britain | Aug. 15, 1927 |